United States Patent
Hwang et al.

(10) Patent No.: US 9,175,764 B2
(45) Date of Patent: Nov. 3, 2015

(54) HYDRAULIC PRESSURE CONTROL APPARATUS FOR AUTOMATIC TRANSMISSION

(75) Inventors: Jin Young Hwang, Suwon-si (KR); Se Hwan Jo, Goyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 602 days.

(21) Appl. No.: 13/526,377

(22) Filed: Jun. 18, 2012

(65) Prior Publication Data

US 2013/0133766 A1    May 30, 2013

(30) Foreign Application Priority Data

Nov. 29, 2011 (KR) .................. 10-2011-0126329

(51) Int. Cl.
*F16D 33/06* (2006.01)
*F16D 33/00* (2006.01)
*F16H 61/00* (2006.01)

(52) U.S. Cl.
CPC ........ *F16H 61/0021* (2013.01); *F16H 61/0025* (2013.01); *F16H 2061/0037* (2013.01); *Y10T 137/86002* (2015.04)

(58) Field of Classification Search
CPC ............ F16H 61/0021; F16H 61/0025; F16H 61/0037
USPC .................................................. 60/358, 339
See application file for complete search history.

(56) References Cited

U.S. PATENT DOCUMENTS

| | | | |
|---|---|---|---|
| 5,875,865 A | 3/1999 | Wakahara et al. | |
| 6,196,806 B1 | 3/2001 | Van Der Sluis | |
| 2002/0168269 A1* | 11/2002 | Heath et al. | 417/87 |
| 2006/0065217 A1* | 3/2006 | Ikegawa | 123/41.42 |
| 2008/0078173 A1* | 4/2008 | Cronin et al. | 60/389 |
| 2010/0071359 A1* | 3/2010 | Kure et al. | 60/428 |
| 2011/0269583 A1* | 11/2011 | Kawakami et al. | 474/28 |

FOREIGN PATENT DOCUMENTS

DE    103 27 406 (A1)    2/2005
JP    2010-96304 A    4/2010

(Continued)

*Primary Examiner* — Edward Look
*Assistant Examiner* — Daniel Collins
(74) *Attorney, Agent, or Firm* — Morgan, Lewis & Bockius LLP

(57) ABSTRACT

A hydraulic pressure control apparatus for an automatic transmission may include an oil tank, a first hydraulic pump fluid-connected with the oil tank for generating a first hydraulic pressure, a second hydraulic pump fluid-connected with the first hydraulic pump for generating a second hydraulic pressure higher than the first pressure, a torque converter and a lubrication portion fluid-connected to a first low pressure supply line to receive the first hydraulic pressure, a first high pressure supply line fluid-connected to the second hydraulic pump and to a powertrain, a switching valve bifurcated from the first low pressure supply line and fluid-connected to the first hydraulic pump and both the torque converter and the lubrication portion, and a feedback line fluid-connected to the first high pressure supply line to the switching valve so as to selectively open or close the switching valve according to the second hydraulic pressure.

12 Claims, 2 Drawing Sheets

(56) References Cited

FOREIGN PATENT DOCUMENTS

| | | |
|---|---|---|
| JP | 2010-101427 A | 5/2010 |
| JP | 2011-80537 A | 4/2011 |
| JP | 2011-112215 A | 6/2011 |
| KR | 10-0369190 B1 | 1/2003 |
| KR | 10-2007-0057833 (A) | 6/2007 |
| KR | 10-0951985 B1 | 4/2010 |
| WO | WO 2007/141323 (A1) | 12/2007 |

* cited by examiner

HYDRAULIC PRESSURE CONTROL APPARATUS FOR AUTOMATIC TRANSMISSION

CROSS-REFERENCE TO RELATED APPLICATION

The present application claims priority to Korean Patent Application No. 10-2011-0126329 filed in the Korean Intellectual Property Office on Nov. 29, 2011, the entire contents of which is incorporated herein for all purposes by this reference.

BACKGROUND OF THE INVENTION

1. Field of the Invention

The present invention relates to a hydraulic pressure control apparatus for an automatic transmission. More particularly, the present invention relates to a hydraulic pressure control apparatus for an automatic transmission that is provided with two oil pumps.

2. Description of Related Art

Generally, an automatic transmission includes a torque converter and a powertrain. In addition, the powertrain realizes multiple shifts by being connected with the torque converter. Further, a hydraulic pump (electric oil pump) is provided so as to supply operating pressure to the automatic transmission, and a TCU (transmission control unit) is provided so as to control operation of the automatic transmission.

Recently, a hydraulic pressure control apparatus for an automatic transmission having the two hydraulic pumps has been applied so as to enhance fuel consumption rate. A pressure of oil supplied from an oil tank is increased sequentially via the two hydraulic pumps in a hydraulic pressure control apparatus for an automatic transmission having the two hydraulic pumps. In addition, oil forms a low pressure portion via a hydraulic pump and oil forms a high pressure portion via the other hydraulic pump. Further, oil of the low pressure portion is supplied to a torque converter and a lubrication portion and oil of the high pressure portion is supplied to a powertrain so as to operate brakes and clutches.

Meanwhile, in a hydraulic pressure control apparatus for an automatic transmission having the two hydraulic pumps, when hydraulic pressure of the high pressure portion is deteriorated so as to supply hydraulic pressure to the low pressure portion, a load of the brakes and the clutches is generated and durability thereof is deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hydraulic pressure control apparatus for an automatic transmission having advantages of having hydraulic pressure of a high pressure portion reach a target hydraulic pressure earlier than hydraulic pressure of the low pressure portion.

In an aspect of the present invention, a hydraulic pressure control apparatus for an automatic transmission may include an oil tank for storing oil, a first hydraulic pump fluid-connected with the oil tank to receive the oil from the oil tank, and adapted to generate a first hydraulic pressure, a second hydraulic pump fluid-connected with the first hydraulic pump to receive the first hydraulic pressure, and adapted to generate a second hydraulic pressure, a torque converter and a lubrication portion fluid-connected to the first hydraulic pump and adapted to receive the first hydraulic pressure from the first hydraulic pump, a powertrain fluid-connected to the second hydraulic pump and adapted to receive the second hydraulic pressure from the second hydraulic pump, a switching valve interposed between the first hydraulic pump and both the torque converter and the lubrication portion so as to selectively supply a part of the first hydraulic pressure to the torque converter and the lubrication portion, and a feedback line fluid-connected between the switching valve and a fluid passage formed between the powertrain and the second hydraulic pump and adapted to supply a part of the second hydraulic pressure supplied to the powertrain to the switching valve so as to selectively open/close the switching valve.

The apparatus may further include a first regulating valve interposed between the first hydraulic pump and both the torque converter and the lubrication portion and adapted to regulate the first hydraulic pressure so as to supply a regulated first hydraulic pressure to the torque converter and the lubrication portion, and a second regulating valve interposed between the second hydraulic pump and the powertrain and adapted to regulate the second hydraulic pressure so as to supply a regulated second hydraulic pressure to the powertrain.

The apparatus may further include a variable control solenoid valve adapted to provide a control pressure to the first and second regulating valves.

Each of the first and second hydraulic pumps is an electric hydraulic pump.

The apparatus mat may further include a first low pressure supply line bifurcated from a passage connecting the first hydraulic pump with the second hydraulic pump and fluid-connected to the first regulating valve to supply the first hydraulic pressure to the first regulating valve, a second low pressure supply line fluid-connected to the first regulating valve and both the torque converter and the lubrication portion, an orifice mounted in the second low pressure supply line and adapted to continuously supply oil passing through the first regulating valve to the torque converter and the lubrication portion, a third low pressure supply line bifurcated from the second low pressure supply line and returned to the second low pressure supply line, wherein the switching valve is mounted to the third low pressure line, and wherein the switching valve selectively supply a part of the regulated first hydraulic pressure to the torque converter and the lubrication portion through the third low pressure supply line, a first high pressure supply line fluid-connected between the second hydraulic pump and the second regulating valve, and adapted to supply oil pumped from the second hydraulic pump to the second regulating valve, and a second high pressure supply line fluid-connected between the second regulating valve and the powertrain and adapted to supply the regulated second hydraulic pressure oil to the powertrain.

The feedback line is bifurcated from the second high pressure supply line and connected with the switching valve.

The switching valve is opened by receiving, through the feedback line, the part of the regulated second hydraulic pressure supplied to the powertrain when the regulated second hydraulic pressure supplied to the powertrain is higher than or equal to a preset value.

In another aspect of the present invention, a hydraulic pressure control apparatus for an automatic transmission may further include an oil tank for storing oil, a first hydraulic pump fluid-connected with the oil tank to receive the oil from the oil tank, for generating a first hydraulic pressure, a second hydraulic pump fluid-connected with the first hydraulic pump via a passage to receive the first hydraulic pressure from the first hydraulic pump for generating a second hydraulic pressure higher than the first pressure of the first hydraulic pump, a torque converter and a lubrication portion fluid-connected to a first low pressure supply line fluid-connected to the passage to receive the first hydraulic pressure from the first hydraulic pump, a first high pressure supply line fluid-connected to the second hydraulic pump and to a powertrain to supply the second hydraulic pressure of the second hydraulic pump to the powertrain, a switching valve bifurcated from the first low pressure supply line and fluid-connected to the first hydraulic pump and both the torque converter and the lubrication portion, and a feedback line fluid-connected to the first high pressure supply line to the switching valve to supply a part of the second hydraulic pressure to the switching valve through the feedback line so as to selectively open or close the switching valve according to the second hydraulic pressure in the first high pressure supply line.

The apparatus may further include a first regulating valve mounted in the first low pressure supply line between the first hydraulic pump and both the torque converter and the lubrication portion to regulate the first hydraulic pressure supplied to the torque converter and the lubrication portion, and a second regulating valve mounted in the first high pressure supply line between the second hydraulic pump and the powertrain to regulate the second hydraulic pressure supplied to the powertrain.

The apparatus may further include a variable control solenoid valve fluid-connected to the first and second regulating valves to provide a control pressure to the first and second regulating valves.

The apparatus may further include a second low pressure supply line fluid-connected between the first regulation valve and both the lubrication portion and the torque converter, a third low pressure supply line bifurcated from the second low pressure supply line, fluid-connected to the switching valve, and returned to the second low pressure supply line, to selectively supply a part of the first hydraulic pressure passing through the first regulating valve to the torque converter and the lubrication portion according to the second hydraulic pressure applied to the switching valve through the feedback line, and an orifice mounted to the second low pressure supply line between both connecting portions of the second low pressure supply line and the third low pressure supply line.

The switching valve is opened by receiving, through the feedback line, the part of the second hydraulic pressure when the second hydraulic pressure supplied to the powertrain is higher than or equal to a preset value.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
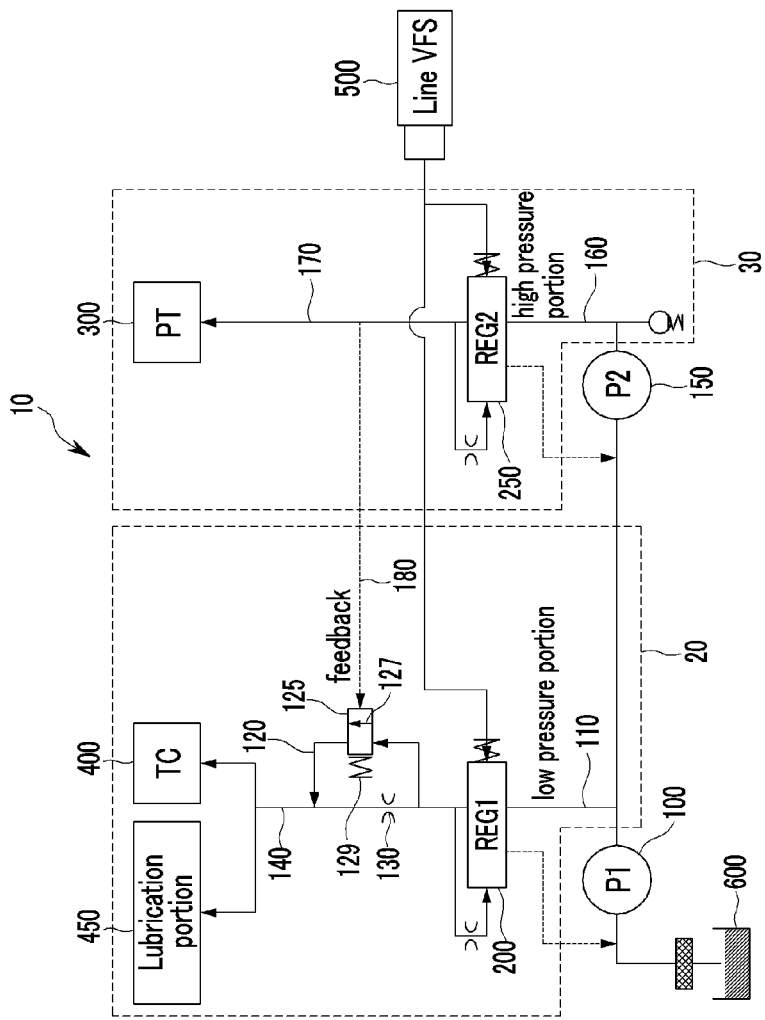
FIG. 1 is a schematic diagram of a hydraulic pressure control apparatus for an automatic transmission in a state that a switching valve is closed according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a schematic diagram of a hydraulic pressure control apparatus for an automatic transmission in a state that a switching valve is closed according to an exemplary embodiment of the present invention. In addition, FIG. 2 is a schematic diagram of a hydraulic pressure control apparatus for an automatic transmission in a state that a switching valve is opened according to an exemplary embodiment of the present invention.

Figure 2:
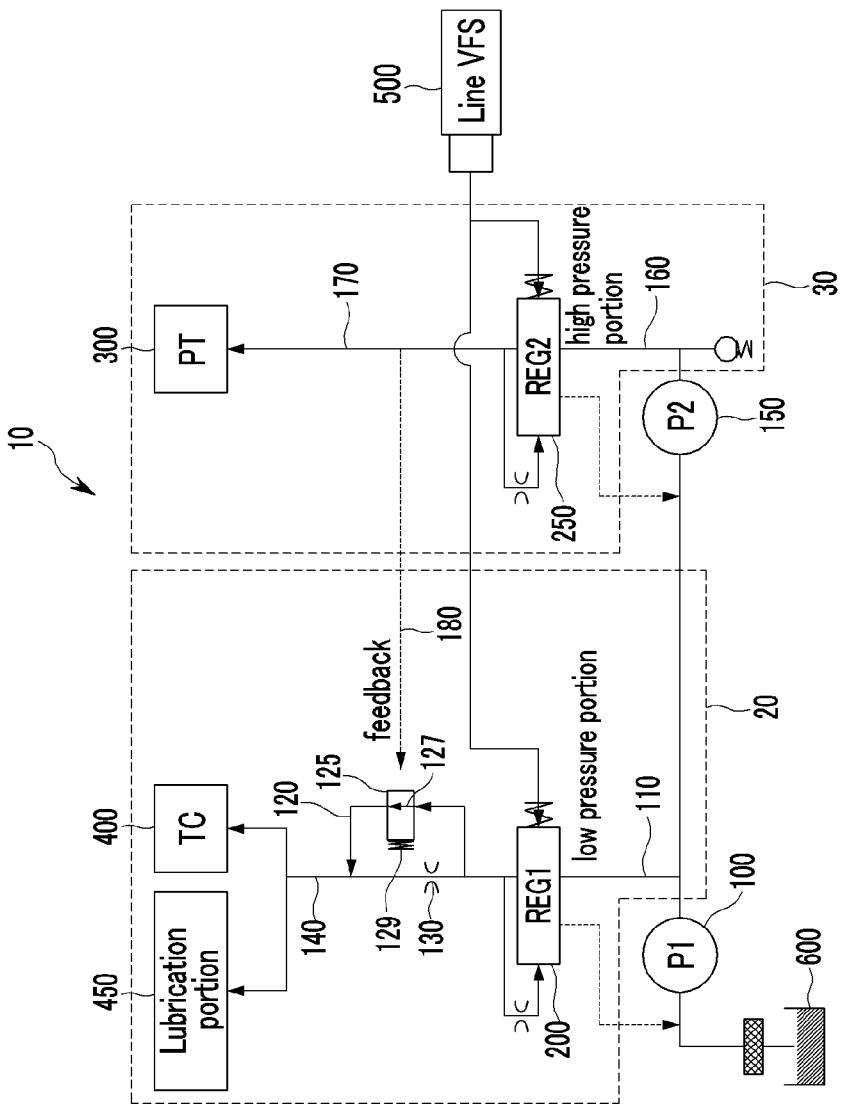
FIG. 2 is a schematic diagram of a hydraulic pressure control apparatus for an automatic transmission in a state that a switching valve is opened according to an exemplary embodiment of the present invention.

FIG. 1 and as shown in FIG. 2, a hydraulic pressure control apparatus 10 for an automatic transmission according to an exemplary embodiment of the present invention includes a powertrain 300, a torque converter 400, a lubrication portion 450, an oil tank 600, a first hydraulic pump 100, a second hydraulic pump 150, a first regulating valve 200, a second regulating valve 250, a variable control solenoid valve 500, a switching valve 125 and a feedback line 180.

The powertrain 300 is adapted to transfer output of an engine to a wheel, and is provided with clutches, brakes, a transmission, an impellent shaft, planetary gear sets, and a driveshaft. The powertrain 300 is provided to the general automatic transmission, and is well-known to a person of ordinary skill in the art. Therefore, a detailed description thereof will be omitted.

The torque converter 400 is adapted to transfer torque by using fluid and to amplify the torque. The torque converter 400 is provided in a general automatic transmission and is well-known to a person of ordinary skill in the art. Therefore, a detailed description thereof will be omitted.

The lubrication portion 450 supplies oil so as to lubricate an engine and the powertrain 300.

The oil tank 600 stores oil to generate hydraulic pressure so as to operate the hydraulic pressure control apparatus 10.

The first hydraulic pump 100 pumps oil supplied from the oil tank 600 and forms a low pressure portion 20 by the operation. In addition, the second hydraulic pump 150 pumps oil supplied from the first hydraulic pump 100 and forms a high pressure portion 30 by the operation. Further, the oil of the low pressure portion 20 is supplied to the torque converter 400 and the lubrication portion 450, and the oil of the high pressure portion 30 is supplied to the powertrain 300. The oil of the high pressure portion 30 supplied to the powertrain 300 forms hydraulic pressure to operate a clutch and a brake provided at the powertrain 300. Meanwhile, the first hydraulic pump 100 and the second hydraulic pump 150 may be electric hydraulic pumps operated by a motor.

The first regulating valve 200 is disposed between the first hydraulic pump 100 and both of the torque converter 400 and the lubrication portion 450, and maintains hydraulic pressure supplied to the torque converter 400. In other words, the oil pumped from the first hydraulic pump 100 is supplied to the torque converter 400 via the first regulating valve 200.

The second regulating valve 250 is disposed between the second hydraulic pump 150 and the powertrain 300, and maintains hydraulic pressure supplied to the powertrain 300. In other words, the oil pumped from the second hydraulic pump 150 is supplied to the powertrain 300 via the second regulating valve 250.

The variable control solenoid valve 500 is connected to the first regulating valve 200 and the second regulating valve 250 so as to change the target hydraulic pressure of the first regulating valve 200 and the second regulating valve 250. In other words, the target hydraulic pressure can be changed according to control pressure of the variable control solenoid valve 500.

The switching valve 125 is interposed between the first regulating valve 200 and both the torque converter 400 and the lubrication portion 450 so as to selectively supply oil to the torque converter 400 and the lubrication portion 450.

The feedback line 180 selectively supplies oil of the high pressure portion 30 to the switching valve 125. In other words, the feedback line 180 is adapted to supply a part of hydraulic pressure supplied to the powertrain 300 to the switching valve 125 so as to selectively open/close the switching valve 125. In addition, the oil is supplied from the high pressure portion 30 to the switching valve 125 when an operating pressure supplied to the powertrain 300 is higher than or equal to a preset value. Further, the switching valve 125 is opened by receiving oil from the high pressure portion 30 and the oil is supplied to the torque converter 400 and the lubrication portion 450.

In addition, the hydraulic pressure control apparatus 10 further includes a first low pressure supply line 110, an orifice 130, a second low pressure supply line 140, a third low pressure supply line 120, a first high pressure supply line 160 and a second high pressure supply line 170.

The first low pressure supply line 110 is bifurcated from an oil passage to connect the first hydraulic pump 100 with the second hydraulic pump 150 and is connected to the first regulating valve 200. In other words, a part of oil pumped from the first hydraulic pump 100 is supplied to the second hydraulic pump 150, and the other part of the oil is supplied to the first regulating valve 200.

The third low pressure supply line 120 is formed such that oil supplied via the first regulating valve 200 is passed. In addition, the orifice 130 is bifurcated from the third low pressure supply line 120. Further, the third low pressure supply line 120 is adapted to bypass the orifice.

The switching valve 125 is mounted on the third low pressure supply line 120. In other words, the third low pressure supply line 120 is selectively opened so as to connect with the torque converter 400 and the lubrication portion 450 according to opening/closing of the switching valve 125. Meanwhile, the orifice 130 is a passage of which a cross-section is narrow and a length thereof is relatively short. The orifice 130 is adapted to always supply minimum oil to the torque converter 400 and the lubrication portion 450.

The second low pressure supply line 140 is formed such that the third low pressure supply line 120 bypassing the orifice 130 and the orifice 130 join together. In other words, oil passing through both the second low pressure supply line and the orifice is supplied to the torque converter 400 and the lubrication portion 450. In addition, the second low pressure supply line 140 is divided into two lines so as to supply oil to each of the torque converter 400 and the lubrication portion 450.

The first high pressure supply line 160 connects the second hydraulic pump 150 with the second regulating valve 250. That is, the first high pressure supply line 160 supplies oil pumped from the second hydraulic pump 150 to the second regulating valve 250.

The second high pressure supply line 170 connects the second regulating valve 250 with the powertrain 300. In other words, the second high pressure supply line 170 supplies oil passing through the second regulating valve 250 to the powertrain 300. In addition, the feedback line 180 is bifurcated from the second high pressure supply line 170. Further, when the operating pressure supplied to the powertrain 300 is higher than or equal to the preset value, oil of the second high pressure supply line 170 is supplied to the switching valve 125 through the feedback line 180 and an operating pressure of the switching valve 125 is formed.

FIG. 1 shows the state that the switching valve 125 is closed when the operating pressure supplied to the powertrain 300 is lower than the preset value.

If the operating pressure supplied to the powertrain 300 is lower than the preset value, the switching valve 125 is closed and all the oil excluding minimum oil passing through the orifice 130 of oil passing through the first hydraulic pump 100 is supplied to the second hydraulic pump 150. Therefore, hydraulic pressure of the high pressure portion 30 can be increased for reaching the preset value earlier than hydraulic pressure of the low pressure portion 20 by pumping of the second hydraulic pump 150.

FIG. 2 show the state that the switching valve 125 is opened when the operating pressure supplied to the powertrain 300 is higher than or equal to the preset value.

If the operating pressure supplied to the powertrain 300 becomes higher than or equal to the preset value by increasing hydraulic pressure of the high pressure portion 30 earlier than hydraulic pressure of the low pressure portion 20, the switching valve 125 is opened and the third low pressure supply line 120 is communicated by operating of the feedback line 180. In other words, oil passing through the first hydraulic pump 100 is supplied to the lubrication portion 450 and the torque converter 400 via the third low pressure supply line 120 and the orifice 130.

The switching valve 125 includes a valve penetration line 127 and an elastic member 129.

The valve penetration line 127 penetrates the switching valve 125. In addition, the third low pressure supply line 120 is communicated when the valve penetration line 127 is positioned to the third low pressure supply line 120. Further, the valve penetration line 127 is positioned to the third low pressure supply line 120 by moving of the switching valve 125 since an end of the switching valve 125 is pushed when the switching valve 125 receives hydraulic pressure through the feedback line 180.

The elastic member 129 is disposed on the other end of the switching valve 125. In other words, the switching valve 125 returns to the original position according to elastic force of the elastic member 129 when supply of hydraulic pressure through the feedback line 180 is stopped. In addition, the third low pressure supply line 120 is disconnected since the valve penetration line 127 is not positioned to the third low pressure supply line 120.

According to an exemplary embodiment of the present invention, momentary hydraulic pressure deterioration of the high pressure portion 30 generated by supplying hydraulic pressure to the low pressure portion 20 can be eliminated since hydraulic pressure of the high pressure portion 30 is increased for reaching a target hydraulic pressure of the preset value earlier than hydraulic pressure of the low pressure portion 20. Therefore, durability of brakes and clutches is improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic pressure control apparatus for an automatic transmission comprising:
   an oil tank for storing oil;
   a first hydraulic pump fluid-connected with the oil tank to receive the oil from the oil tank, and adapted to generate a first hydraulic pressure;
   a second hydraulic pump fluid-connected with the first hydraulic pump to receive the first hydraulic pressure, and adapted to generate a second hydraulic pressure;
   a torque converter and a lubrication portion fluid-connected to the first hydraulic pump and adapted to receive the first hydraulic pressure from the first hydraulic pump;
   a powertrain fluid-connected to the second hydraulic pump and adapted to receive the second hydraulic pressure from the second hydraulic pump;
   a switching valve interposed between the first hydraulic pump and both the torque converter and the lubrication portion so as to selectively supply a part of the first hydraulic pressure to the torque converter and the lubrication portion; and
   a feedback line fluid-connected between the switching valve and a fluid passage formed between the powertrain and the second hydraulic pump and adapted to supply a part of the second hydraulic pressure supplied to the powertrain to the switching valve so as to selectively open/close the switching valve.

2. The apparatus of claim 1, further comprising:
   a first regulating valve interposed between the first hydraulic pump and both the torque converter and the lubrication portion and adapted to regulate the first hydraulic pressure so as to supply a regulated first hydraulic pressure to the torque converter and the lubrication portion; and
   a second regulating valve interposed between the second hydraulic pump and the powertrain and adapted to regulate the second hydraulic pressure so as to supply a regulated second hydraulic pressure to the powertrain.

3. The apparatus of claim 2, further comprising a variable control solenoid valve adapted to provide a control pressure to the first and second regulating valves.

4. The apparatus of claim 1, wherein each of the first and second hydraulic pumps is an electric hydraulic pump.

5. The apparatus of claim 2, further comprising:
   a first low pressure supply line bifurcated from a passage connecting the first hydraulic pump with the second hydraulic pump and fluid-connected to the first regulating valve to supply the first hydraulic pressure to the first regulating valve;
   a second low pressure supply line fluid-connected to the first regulating valve and both the torque converter and the lubrication portion;
   an orifice mounted in the second low pressure supply line and adapted to continuously supply oil passing through the first regulating valve to the torque converter and the lubrication portion;
   a third low pressure supply line bifurcated from the second low pressure supply line and returned to the second low pressure supply line, wherein the switching valve is mounted to the third low pressure line, and wherein the switching valve selectively supply a part of the regulated first hydraulic pressure to the torque converter and the lubrication portion through the third low pressure supply line;
   a first high pressure supply line fluid-connected between the second hydraulic pump and the second regulating valve, and adapted to supply oil pumped from the second hydraulic pump to the second regulating valve; and
   a second high pressure supply line fluid-connected between the second regulating valve and the powertrain and adapted to supply the regulated second hydraulic pressure oil to the powertrain.

6. The apparatus of claim 5, wherein the feedback line is bifurcated from the second high pressure supply line and connected with the switching valve.

7. The apparatus of claim 1, wherein the switching valve is opened by receiving, through the feedback line, the part of the regulated second hydraulic pressure supplied to the powertrain when the regulated second hydraulic pressure supplied to the powertrain is higher than or equal to a preset value.

8. A hydraulic pressure control apparatus for an automatic transmission comprising:
   an oil tank for storing oil;
   a first hydraulic pump fluid-connected with the oil tank to receive the oil from the oil tank, for generating a first hydraulic pressure;
   a second hydraulic pump fluid-connected with the first hydraulic pump via a passage to receive the first hydraulic pressure from the first hydraulic pump for generating a second hydraulic pressure higher than the first pressure of the first hydraulic pump;
   a torque converter and a lubrication portion fluid-connected to a first low pressure supply line fluid-connected to the passage to receive the first hydraulic pressure from the first hydraulic pump;
   a first high pressure supply line fluid-connected to the second hydraulic pump and to a powertrain to supply the second hydraulic pressure of the second hydraulic pump to the powertrain;
   a switching valve bifurcated from the first low pressure supply line and fluid-connected to the first hydraulic pump and both the torque converter and the lubrication portion; and
   a feedback line fluid-connected to the first high pressure supply line to the switching valve to supply a part of the second hydraulic pressure to the switching valve through the feedback line so as to selectively open or close the switching valve according to the second hydraulic pressure in the first high pressure supply line.

9. The apparatus of claim 8, further comprising:
a first regulating valve mounted in the first low pressure supply line between the first hydraulic pump and both the torque converter and the lubrication portion to regulate the first hydraulic pressure supplied to the torque converter and the lubrication portion; and
a second regulating valve mounted in the first high pressure supply line between the second hydraulic pump and the powertrain to regulate the second hydraulic pressure supplied to the powertrain.

10. The apparatus of claim 9, further comprising a variable control solenoid valve fluid-connected to the first and second regulating valves to provide a control pressure to the first and second regulating valves.

11. The apparatus of claim 9, further comprising:
a second low pressure supply line fluid-connected between the first regulation valve and both the lubrication portion and the torque converter;
a third low pressure supply line bifurcated from the second low pressure supply line, fluid-connected to the switching valve, and returned to the second low pressure supply line, to selectively supply a part, of the first hydraulic pressure passing through the first regulating valve to the torque converter and the lubrication portion according to the second hydraulic pressure applied to the switching valve through the feedback line; and
an orifice mounted to the second low pressure supply line between both connecting portions of the second low pressure supply line and the third low pressure supply line.

12. The apparatus of claim 8, wherein the switching valve is opened by receiving, through the feedback line, the part of the second hydraulic pressure when the second hydraulic pressure supplied to the powertrain is higher than or equal to a preset value.

* * * * *